(12) United States Patent
Deylitz et al.

(10) Patent No.: US 7,067,747 B2
(45) Date of Patent: Jun. 27, 2006

(54) PROTECTIVE UNIT TO PREVENT CONTACT WITH CONDUCTIVE CONTACTS IN A WITHDRAWABLE SPACE OF SWITCHING DEVICE

(75) Inventors: Erhard Deylitz, Berlin (DE); Kathrina Marek, Zepernick (DE)

(73) Assignee: Siemens Aktiengesellschaft, Munich (DE)

( * ) Notice: Subject to any disclaimer, the term of this patent is extended or adjusted under 35 U.S.C. 154(b) by 313 days.

(21) Appl. No.: 10/475,608

(22) PCT Filed: Apr. 18, 2002

(86) PCT No.: PCT/DE02/01464

§ 371 (c)(1),
(2), (4) Date: Oct. 22, 2003

(87) PCT Pub. No.: WO02/087038

PCT Pub. Date: Oct. 31, 2002

(65) Prior Publication Data

US 2004/0129545 A1 Jul. 8, 2004

(30) Foreign Application Priority Data

Apr. 23, 2001 (DE) .......................................... 101 20 749

(51) Int. Cl.
*H01H 9/20* (2006.01)

(52) U.S. Cl. .................. 200/50.21; 200/50.23
(58) Field of Classification Search ... 200/50.21–50.23, 200/50.27, 333, 334; 361/605–609, 615–617
See application file for complete search history.

(56) References Cited

U.S. PATENT DOCUMENTS

| | | | | |
|---|---|---|---|---|
| 2,943,163 A | * | 6/1960 | Hay ......................... | 200/50.21 |
| 3,778,568 A | * | 12/1973 | Wilson ..................... | 200/50.22 |
| 4,209,676 A | * | 6/1980 | Clausing .................. | 200/50.21 |
| 4,443,676 A | * | 4/1984 | Castonguay ................ | 200/304 |
| 4,933,519 A | * | 6/1990 | Milianowicz et al. ......... | 218/22 |
| 6,031,191 A | | 2/2000 | Ahlert et al. | |
| 6,184,483 B1 | * | 2/2001 | Coudert et al. .......... | 200/50.21 |
| 6,727,442 B1 | * | 4/2004 | Byron et al. ............. | 200/50.27 |

FOREIGN PATENT DOCUMENTS

| | | |
|---|---|---|
| EP | 0235492 | 12/1986 |
| EP | 0803140 | 1/1996 |

* cited by examiner

*Primary Examiner*—Elvin Enad
*Assistant Examiner*—Lisa Klaus
(74) *Attorney, Agent, or Firm*—Harness, Dickey & Pirece P.L.C.

(57) ABSTRACT

A protective unit may prevent contact with conductive contacts in a withdrawable rack of a switching device. This may include one displaceable protective plate and lever arrangement for operating the protective plate. The lever arrangement has two levers that are interconnected in an articulated manner, of which a first lever can be operated by way of the switching device and the second lever is coupled to the mobile protective plate. A linking joint of the two levers acts simultaneously as the pivot bearing of the first lever and the first lever can be pivoted out of the displacement path of the switching device into an end position by way of a slide block that runs in a graded manner in the pivoting direction of the first lever.

20 Claims, 4 Drawing Sheets

PROTECTIVE UNIT TO PREVENT CONTACT WITH CONDUCTIVE CONTACTS IN A WITHDRAWABLE SPACE OF SWITCHING DEVICE

This application is the national phase under 35 U.S.C. § 371 of PCT International Application No. PCT/DE02/01464 which has an International filing date of Apr. 18, 2002, which designated the United States of America and which claims priority on German Patent Application number DE 101 20 749.2 filed Apr. 23, 2001, the entire contents of which are hereby incorporated herein by reference.

FIELD OF THE INVENTION

The present invention generally relates to electrical switches used for the configuration of a withdrawable rack for a displaceably arranged switching device, in which a protective unit is provided to prevent contact with conductive contacts.

BACKGROUND OF THE INVENTION

In the case of a known withdrawable rack, a protective unit with two movable protective plates—which are displaceable for the release of access openings formed in a cover plate with respect to incoming and outgoing contacts—and two lever arrangements for operating the two protective plates is provided. In this case, each of the two lever arrangements has two levers which are interconnected in an articulated manner, of which a first lever can be operated by means of the switching device and the second lever is coupled to the movable protective plate, the first lever being displaceable in a first phase of the pushing-in movement of the switching device—for pivoting the second lever—and being pivotable in a second phase of the pushing-in movement—without further pivoting of the second lever (EP 0 803 140 B1).

In the case of this known protective unit, the ends of the two first levers that are allocated to the switching device are interconnected in an articulated manner, the linking joint of the two first levers acting simultaneously as the pivot bearing of these levers. To allow the switching device to be pushed into its end position in the withdrawable rack after release of the access openings, the two first levers are displaceable under the effect of the force of the moving-in switching device by the linking joint between the first lever and the second lever being respectively displaceable along a slideway. As this happens, jamming of the linking joint in the slideway as the switching device is pushed further can lead to the lever arrangement being damaged.

SUMMARY OF THE INVENTION

The present invention is based on an object of configuring the lever arrangement in such a way that, after release of the access openings to the contacts, it is not necessary to slide the lever arrangement out of the path of movement of the switching device using the force of the moving-in switching device.

An object of the present invention is achieved according to the present invention by the linking joint of the two levers simultaneously forming the pivot bearing of the first lever, by the first lever having a slide block and by there being formed in the withdrawable rack two guiding surfaces which form a for the slide block, running in a graded manner in the pivoting direction of the first lever, wherein one of the two guiding surfaces form two stepping stages for the slide block, which are allocated to the two pushing-in phases and run substantially in the direction of displacement of the first lever, and wherein the setting stage, connecting the two stepping stages, runs in the pivoting direction of the first lever and forms a stop surface allocated to the slide block.— On account of a configuration of this type, the first lever can be pivoted into an end position shortly after release of the access openings from the path of movement of the switching device. The decoupling of the end of the first lever allocated to the switching device from the switching device allows damage to the lever system to be reliably ruled out when the switching device moves into its end position.

An expedient development of the protective unit provides that the second guiding surface forms a second setting stage, running in the pivoting direction of the first lever, and a third stepping stage for the slide block, running in the pushing-in direction, and that, if it is not operated, the first lever is held under the force of a return spring in an initial position, in which the second setting stage forms a second stop surface, allocated to the slide block, and in which the third stepping stage forms a third stop surface, which is allocated to a stop pin formed on the first lever.—As a result, it is possible, when the switch is moved out, to lock the lever arrangement in an initial position, in which only a force acting in the pivoting direction of the first lever leads to the unlocking of the lever arrangement. On the other hand, any force acting on the first lever in another direction, for example during assembly work, leads to the blocking of the lever system on the second and/or third stop surface.

For operating the first lever there may advantageously be provided a forming cam, which is allocated to the free end of the first lever arm, is carried by the switching device and has a first working surface, which is inclined in the pushing-in direction of the switching device and by way of which the first lever is displaceable in the region of the first stepping stage and, at the end of the first stepping stage, is pivotable, making itself lie adjacent to the first setting stage.—As a result, raising of the protective plate in a way corresponding to the inclination of the working surface over just a few millimeters of the path of movement of the switching device is possible shortly before contacts protruding on the rear side of the switching device engage in the access openings of the cover plate.

An advantageous development of the present invention with regard to the decoupling of the first lever from the switching device during the moving-in of the switching device and the renewed coupling during the moving-out of the switching device provides that the first working surface of the forming cam opens out at a recess, the side edges of which run parallel to the pushing-in direction of the switching device, with a lug being formed on the first side edge and the second side edge forming a fourth stop surface, allocated to the free end of the first lever.

For unlocking the lever arrangement from its initial position, in a further refinement of the present invention it is provided that the forming cam has a second working surface, which is inclined in the pushing-in direction of the switching device and by way of which the first lever can be pivoted to such an extent that the slide block can be pivoted beyond the plane of the third stepping stage, making it lie adjacent to the first stepping stage.

The forming cam provided according to the present invention may be formed on a switch foot mounted on the switching device. In this case, a protective plate, for operating which two lever arrangements acting on its ends are provided, can be uniformly operated by a switch foot designed in such a manner being respectively mounted on each of the two side faces of the switching device.

In a development of the present invention, the lever system has a third lever, coupling the second lever to the protective plate, with a pin which engages in a slot of the second lever and a supporting surface which is allocated to the protective plate being formed on the third lever.—As a result, the first lever and the second lever and the slideway allocated to the slide block can be arranged in a free space to the side of an isolating contact housing bearing the contacts.

If, in a further refinement of the present invention, contacts which run in two different planes, arranged one above the other, are allocated two separate protective plates, these protective plates are coupled by way of a tension spring, and if a supporting surface and a holding surface are provided on the third lever, with the supporting surface being allocated to a protective plate running in the upper plane and the holding surface being allocated to a protective plate running in the lower plane, then, with the switch moved out, the two protective plates can be displaced independently of one another—for example for releasing the incoming and/or outgoing contacts.

Further scope of applicability of the present invention will become apparent from the detailed description given hereinafter. However, it should be understood that the detailed description and specific examples, while indicating exemplary embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EXEMPLARY EMBODIMENTS

Figure 1:
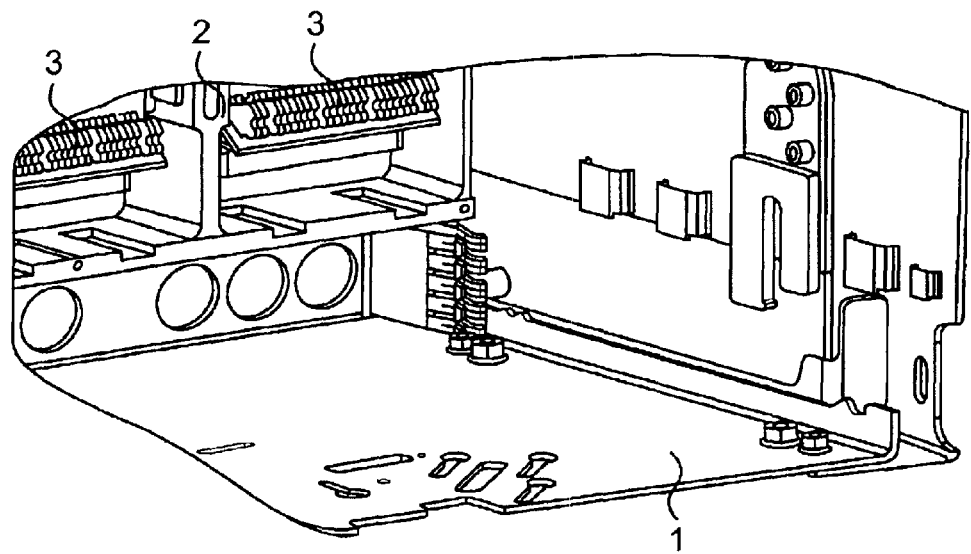
FIG. 1 shows a detail of a withdrawable rack provided with an isolating contact housing.

The withdrawable rack 1 shown in FIG. 1 is provided with an isolating contact housing 2, which serves for receiving conductive contacts, of which incoming and outgoing contacts are arranged in a way not represented any further in planes arranged one above the other.

Figure 2:
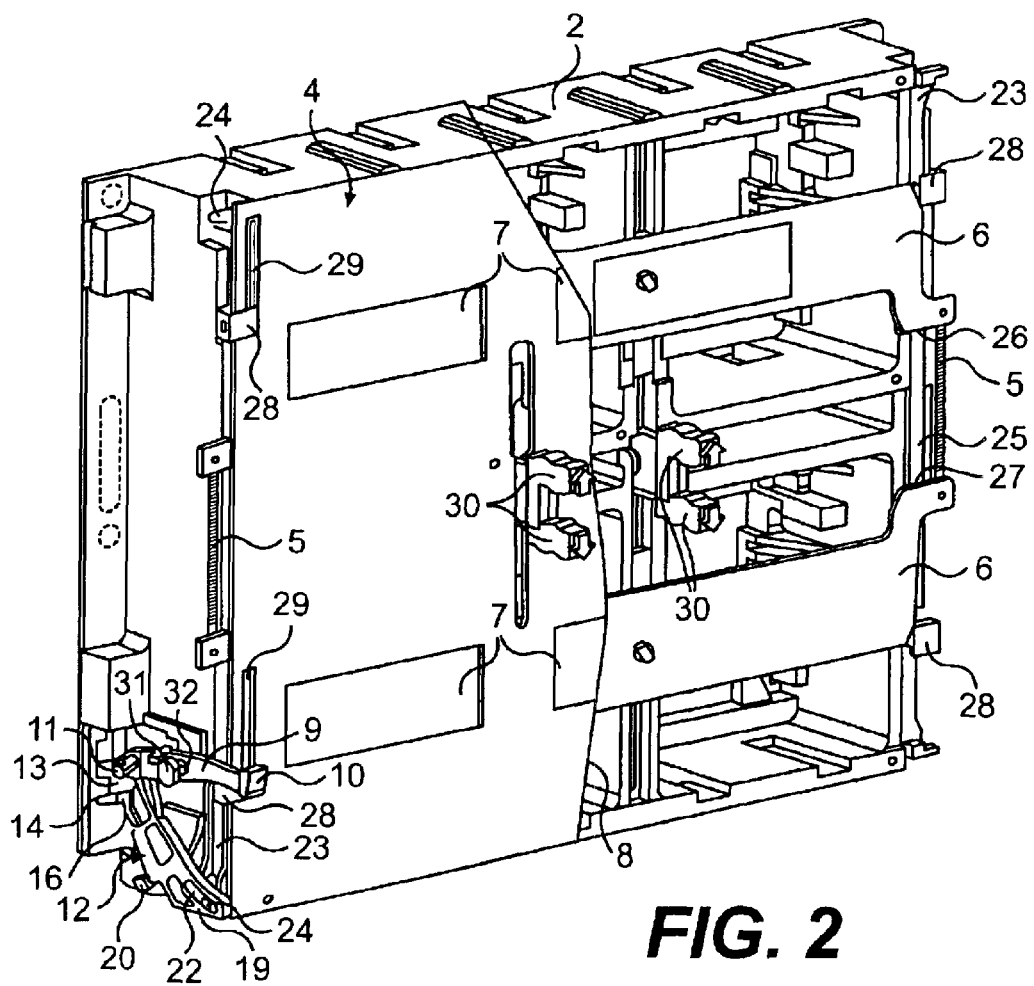
FIG. 2 shows the isolating contact housing according to FIG. 1, on which a protective unit represented in section is mounted to prevent contact with conductive contacts.

According to FIG. 2, a protective unit 4 is mounted on the isolating contact housing 2 to prevent contact with conductive contacts 3. In this case, the protective unit 4 has two movable protective plates 6, which are allocated to contacts arranged in two planes and are coupled by means of two tension springs 5, a cover plate 8, which is provided with access openings 7 with respect to the contacts, and also two identically designed lever arrangements for operating the protective plates.

Each of the two lever arrangements has three levers, of which a first lever 9 can be operated at a free end 10 by means of switching device. The other end of the first lever 9 is articulated by means of a linking joint 11 on a two-armed second lever 12, the linking joint 11 being arranged close to a fixed pivot bearing 13 of the second lever. The fixed pivot bearing 13 is in this case formed by two bearing pins 14 (in FIGS. 2 and 4, only one bearing pin can be seen) and two bearing shells (see also FIG. 3) 15, 16, which are allocated to the bearing pins 14. The bearing pins 14 are in this case arranged on both sides of an elastic tongue 18, which is formed in one piece with the lever body of the second lever 12.

Figure 3:
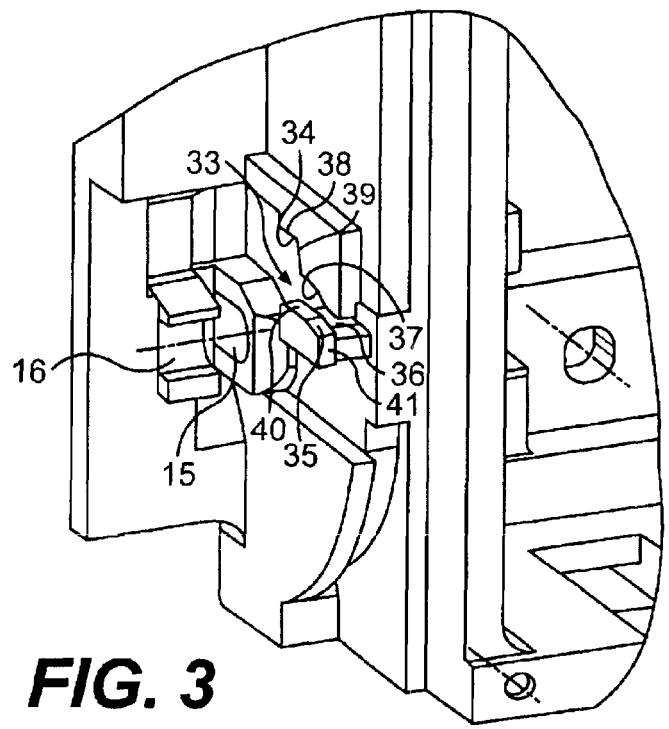
FIG. 3 shows an enlarged detail of the isolating contact housing according to FIG. 2 with the protective unit not mounted.
Figure 4:
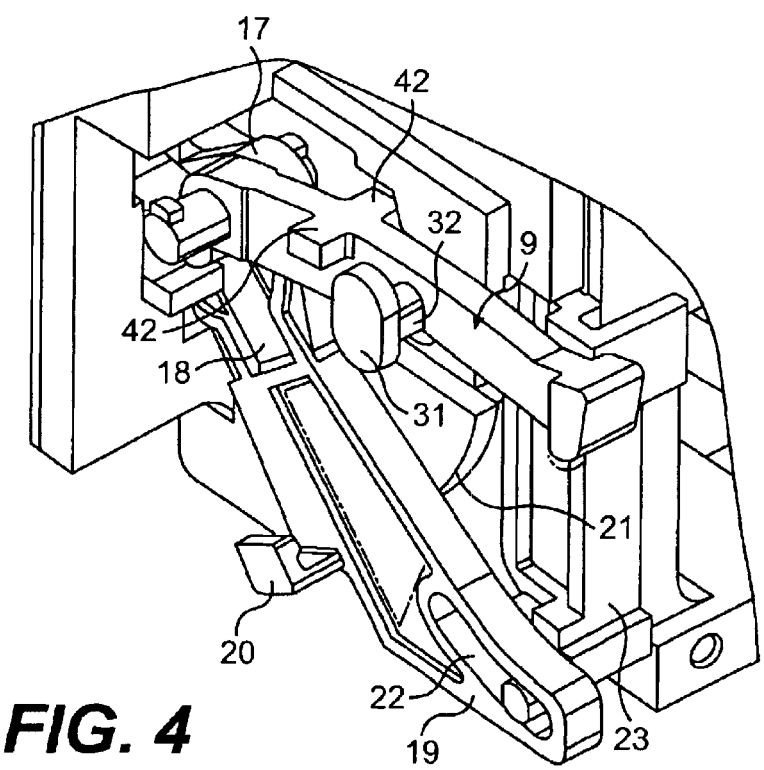
FIG. 4 shows the detail according to FIG. 3 with the protective unit mounted.

The two bearing shells 15, 16, of which one bearing shell 15 is shaped in a substantially cylindrical manner and the second bearing shell 16 is shaped in a half-cylindrical manner, are according to FIG. 3 arranged spaced apart by an amount which corresponds approximately to the thickness of the tongue 18 (cf. also FIG. 4). While the first lever acts on the first lever arm 17 of the second lever 12, to the second lever arm 19 of the second lever 12 there are formed two hook-like projections 20, protruding from the second lever transversely with respect to the pivoting direction of the second lever, of which one engages behind an arcuate edge 21 on the isolating contact housing on one or other of the sides of the isolating contact carrier, depending on the arrangement of the lever arrangement, and consequently axially fixes the second lever. In the second lever arm 19 there is also formed a slot 22. The third lever 23 is symmetrically designed transversely with respect to its direction of displacement and has at each of its two ends a pin 24, of which one engages in the slot 22 formed in the second lever arm 19 on the right-hand or left-hand side of the isolating contact housing, depending on the arrangement of the lever arrangement.

Furthermore, the third lever 23 has a centrally arranged projection 25, which protrudes into the plane of the protective plates 6 and, of the side faces 26, 27 of which, one forms a supporting surface 26 allocated to the upper protective plate and the other forms a holding surface 27 allocated to the lower protective plate on the right-hand or left-hand side face of the isolating contact housing, depending on the arrangement of the lever arrangement. Also formed on the third lever are hook-like projections 28, which engage in the manner of spring catches behind the cover plate 8, provided with the access openings 7, in the region of pairs of guide openings 29 formed on the right-hand and left-hand sides. In this case, the third levers 23, the two movable protective plates 6, the cover plate 8 and four operating elements 30 held on the protective plates are combined to form a functional unit as soon as the two third levers 23 have been made to engage in the guide openings 29 of the cover plate 8 by means of the hook-like projections 28. This functional unit may be pre-assembled in a simple way.

According to FIG. 4, the first lever 9 has on each side a slide block 32 provided with a flange (collar) 31 (of which only one block can be seen in each of FIGS. 2 and 4). The second slide block, which cannot be seen, is in this case guided in a slideway 33 which runs in a graded manner in the pivoting direction of the first lever (see also FIG. 3) and is formed by two guiding surfaces 34 and 35. In this case, the first lever 9 is axially fixed by means of the flange 31 guided in a groove 36.

The guiding surface 34 forms two stepping stages 37 and 38 for the slide block, which run substantially in the direction of displacement of the first lever and are allocated the various phases of the entry movement of a withdrawable switching device. The setting stage 39, connecting the two stepping stages 37 and 38, runs in the pivoting direction of the first lever 9. The second guiding surface 35 forms a third stepping stage 40, running in the direction of displacement of the first lever 9, and also a second setting stage 41, likewise running in the pivoting direction of the first lever 9.

On the first lever 9 there are also formed two stop pins 42, of which one is allocated to the third stepping stage 40 on the right-hand or left-hand side of the isolating contact housing, depending on the arrangement of the lever arrangement. When the lever arrangement is not operated, the first lever 9 is held by means of a return spring 43 (cf. FIG. 5) under spring pretension in an initial position, in which the stop pin 42 lies adjacent to the third stepping stage 40. The return spring thereby acts on the one hand on the slide block 32 and on the other hand, in a way not represented any further, on a side wall of the withdrawable rack.

According to FIGS. 5 to 8, serving for operating the free end 10 of the first lever 9 is a forming cam 44, which is formed on a switch foot 45 which is mounted on a side face of a withdrawable switching device not represented any further. This forming cam 44 has two working surfaces 46 and 47, which are inclined in the pushing-in direction, a first of the two working surfaces 46 opening out at a recess 48, the side edges 49 and 50 of which run parallel to the pushing-in direction of the switching device. In this case, a lug 51 is formed on the one side edge 49.

Figure 5:
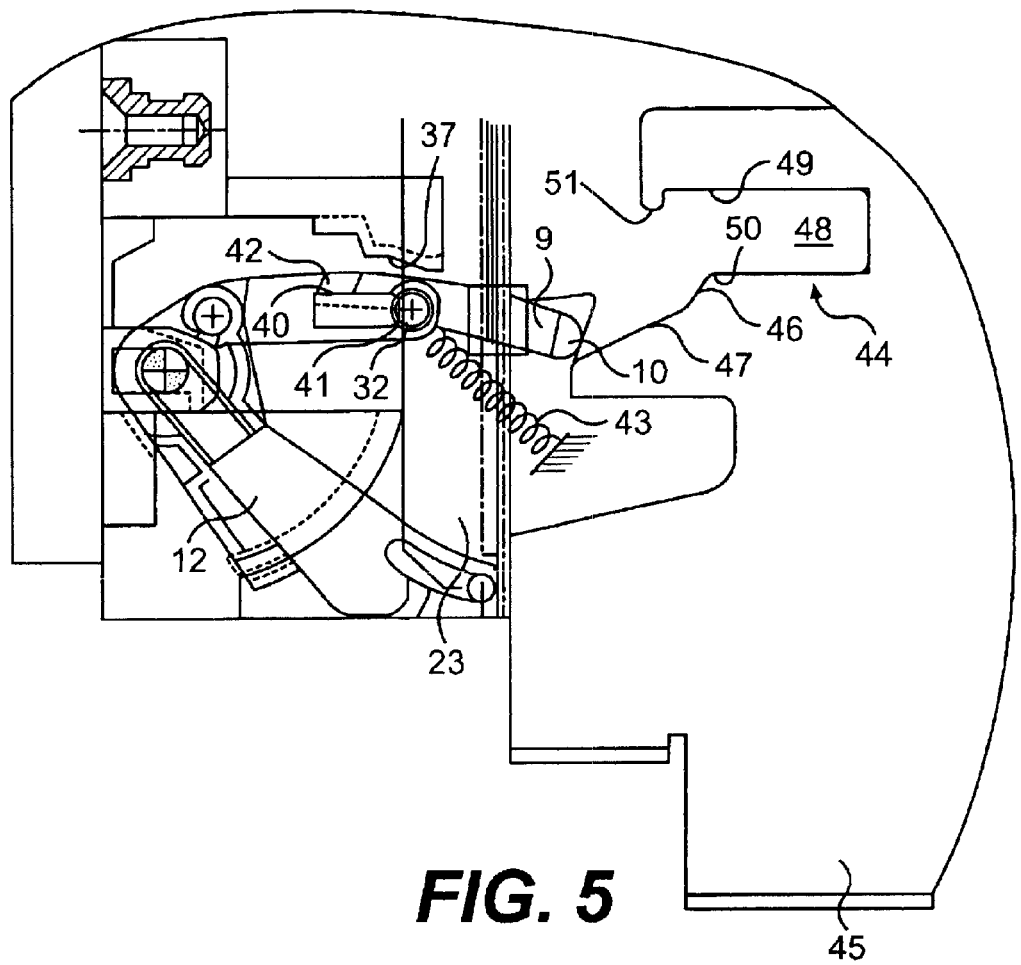
FIGS. 5 to 8 show a side view of the detail according to FIG. 4 in various phases of the pushing-in movement of a withdrawable switching device.
Figure 6:
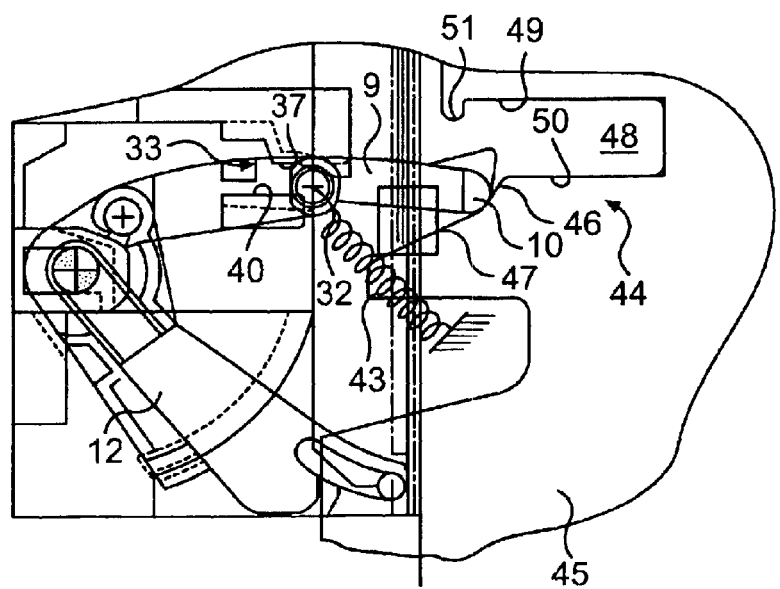
Figure 7:
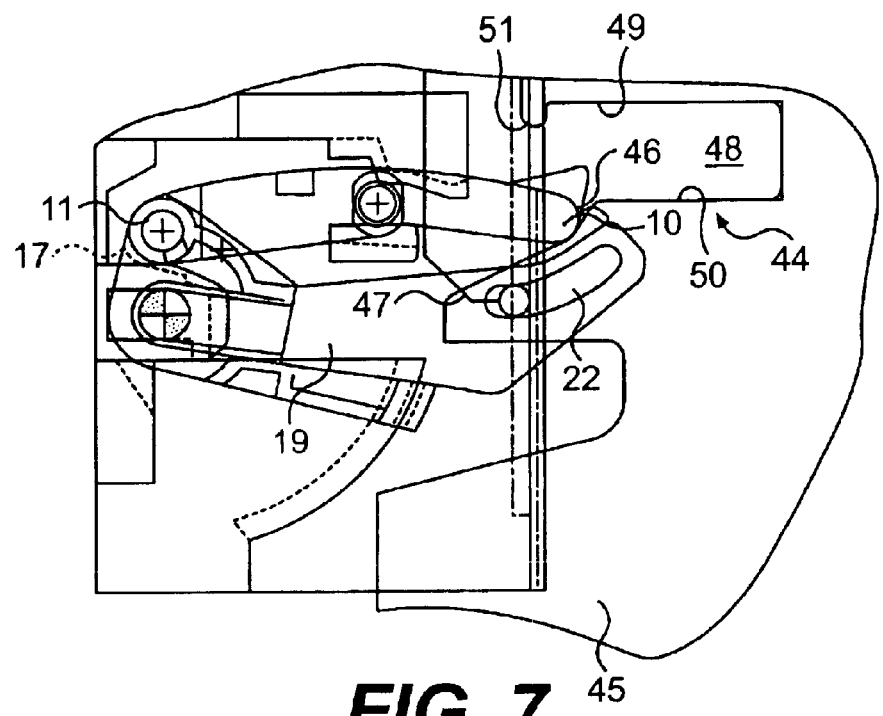
Figure 8:
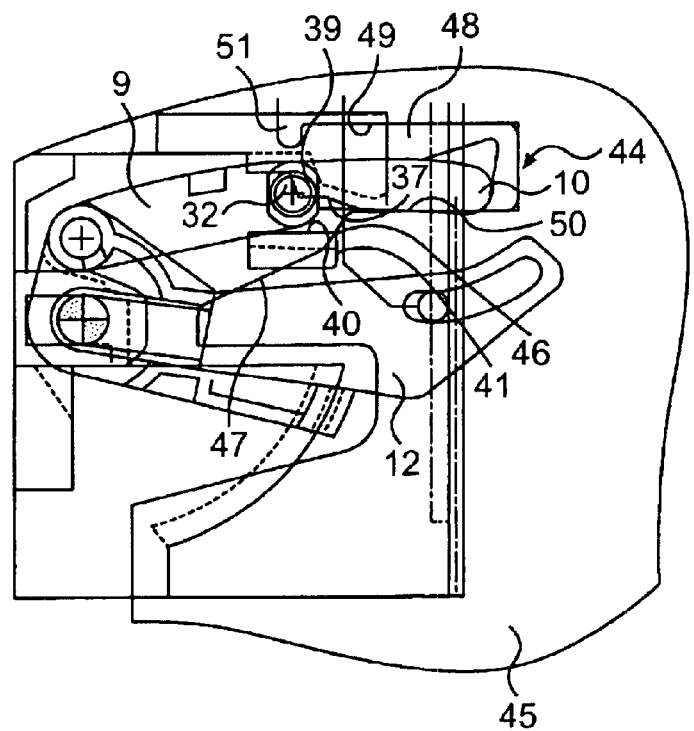

FIG. 5 shows the lever arrangement 9, 12 and 23 with the withdrawable switching device in the isolating position. At this point in time, the first lever 9 is in its initial position, in which the stop pin 42 lies adjacent to the third stepping stage 40 and the slide block 32 lies adjacent to the second setting stage 41. The free end 10 of the first lever 9 lies opposite the second working surface 47, so that, when the withdrawable switching device is pushed further, the first lever 9 is pivoted counterclockwise until the slide block 32 is above the plane of the third stepping stage 40 and strikes against the first stepping stage 37. On account of this pivoting movement of the first lever 9, the lever arrangement, and consequently the protective unit, is unlocked when the test position is reached (cf. also FIG. 6). In this test position, the access openings 7 of the cover plate continue to be covered by way of the protective plates 6, since the second lever 12 is not pivoted when the first lever 9 is pivoted.

When the test position is reached, the first working surface 46 is opposite the free end 10 of the first lever 9. When the withdrawable switching device is pushed further, the first lever 9 is displaced, with the slide block 32 being guided in a portion of the slideway 33 formed by the first stepping stage 37 and the third stepping stage 40. As this happens, according to FIG. 7, the first lever arm 17, which is allocated to the linking joint 11, is pivoted counterclockwise. The second lever arm 19, on which the slot 22 is formed, is significantly longer than the first lever arm 17, so that, when there is slight displacement of the withdrawable switch (about 8 mm), the slot 22 pivots over a great arc length and, as this happens, the third lever 23, which holds the protective plates 6, is lifted to the extent (about 40 mm) that the access openings 7 are released. This lifting of the protective plates 6 takes place shortly before contacts protruding on the rear side of the withdrawable switching device engage in the access openings 6. When the withdrawable switching device is pushed further, the slide block 32 slides off at the set-back edge formed by the first stepping stage 37 and the first setting stage 39, and the first lever pivots according to FIG. 8 into an end position, in which the slide block 32 is adjacent to the first setting stage 39 and the free end 10 of the first lever 9 is adjacent to the second side edge 50 of the recess.

When the withdrawable switching device is pulled out of the withdrawable rack, in a converse way, first of all the first lever 9 is pivoted clockwise by means of the lug 51 formed on the first side edge 49 of the recess 48 until the slide block 32 under the force of the return spring 43 slips off at a set-back edge formed by the first setting stage 39 and the first stepping stage 37, and enters the portion of the slideway formed by the first stepping stage 37 and the third stepping stage 40. When the withdrawable switching device is pulled out further, the first lever 9 is displaced to the right, with the second lever 12 pivoting counterclockwise and the access openings 7 being closed by means of the lowering protective plates 6. After that, the slide block 32 slips off at the second set-back edge, formed by the third stepping stage 40 and the second setting stage 41, so that the first lever 9 pivots into its starting position, without the protective plates 6 being lowered any further.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protective unit to prevent contact with conductive contacts in a withdrawable rack of a switching device, comprising:

at least one displaceable protective plate; and a lever arrangement for operating the protective plate, wherein the lever arrangement has two levers which are interconnected in an articulated manner, a first lever being operated by way of the switching device and a second lever being coupled to the movable protective plate, the first lever being displaceable in a first phase of a pushing-in movement of the switching device and being pivotable in a second phase of the pushing-in movement, and wherein a linking joint of the two levers acts simultaneously as the pivot bearing of the first lever, the first lever having a slide block, and two guiding surfaces are formed in the withdrawable rack, the two guiding surfaces form a slideway for the slide block, running in a graded manner in the pivoting direction of the first lever, one of the two guiding surfaces forms two stepping stages for the slide block, the two stepping stages being allocated to the two pushing-in phases and run substantially in the direction of displacement of the first lever, and wherein the setting stage, connecting the two stepping stages, runs in the pivoting direction of the first lever and forms a stop surface allocated to the slide block.

2. The protective unit as claimed in claim 1, wherein the second guiding surface forms a second setting stage, running in the pivoting direction of the first lever, and a third stepping stage for the slide block, running in the pushing-in direction, wherein, if not operated, the first lever is held under the force of a return spring in an initial position, in which the second setting stage forms a second stop surface, allocated to the slide block, and in which the third stepping stage forms a third stop surface, which is allocated to a stop pin formed on the first lever.

3. The protective unit as claimed in claim 2, wherein the switching device carries a forming cam, the forming cam being allocated to the free end of the first lever and has a first working surface, the first working surface being inclined in the pushing-in direction of the switching device and by way of which the first lever is displaceable in the region of the first stepping stage and, at the end of the first stepping stage, is pivotable, the first working surface being thereby adjacent to the first setting stage.

4. The protective unit as claimed in claims 3, wherein the first working surface of the forming cam opens out at a recess, the side edges thereof running parallel to the pushing-in direction of the switching device, with a lug being formed on the first side edge and the second side edge forming a fourth stop surface, allocated to the free end of the first lever.

5. The protective unit as claimed in claim 3, wherein the forming cam includes a second working surface, the second working surface being inclined in the pushing-in direction of the switching device and by way of which the first lever is pivotable to such an extent that the slide block is pivotable beyond the plane of the third stepping stage, the second working surface being thereby adjacent to the first stepping stage.

6. The protective unit as claimed in claim 2, wherein the lever arrangement further includes a third lever, the third lever for coupling the second lever to the protective plate, the coupling being provided at least using a pin that engages in a slot of the second lever and a supporting surface which is allocated to the protective plate being formed on the third lever.

7. The protective unit as claimed in claim 1, wherein the switching device carries a forming cam, the forming cam being allocated to the free end of the first lever and has a first working surface, the first working surface being inclined in the pushing-in direction of the switching device and by way of which the first lever is displaceable in the region of the first stepping stage and, at the end of the first stepping stage, is pivotable, the first working surface being thereby adjacent to the first setting stage.

8. The protective unit as claimed in claim 7, wherein the first working surface of the forming cam opens out at a recess, the side edges thereof running parallel to the pushing-in direction of the switching device, with a lug being formed on the first side edge and the second side edge forming a fourth stop surface, allocated to the free end of the first lever.

9. The protective unit as claimed in claim 8, wherein the forming cam includes a second working surface, the second working surface being inclined in the pushing-in direction of the switching device and by way of which the first lever is pivotable to such an extent that the slide block is pivotable beyond the plane of the third stepping stage, the second working surface being thereby adjacent to the first stepping stage.

10. The protective unit as claimed in claim 8, wherein the forming cam is formed on a switch foot mounted on the switching device.

11. The protective unit as claimed in claim 8, wherein the lever arrangement further includes a third lever, the third lever for coupling the second lever to the protective plate, the coupling being provided at least using a pin that engages in a slot of the second lever and a supporting surface which is allocated to the protective plate being formed on the third lever.

12. The protective unit as claimed in claim 7, wherein the lever arrangement further includes a third lever, the third lever for coupling the second lever to the protective plate, the coupling being provided at least using a pin that engages in a slot of the second lever and a supporting surface which is allocated to the protective plate being formed on the third lever.

13. The protective unit as claimed in claim 7, wherein the forming cam includes a second working surface, the second working surface being inclined in the pushing-in direction of the switching device and by way of which the first lever is pivotable to such an extent that the slide block is pivotable beyond the plane of the third stepping stage, the second working surface being thereby adjacent to the first stepping stage.

14. The protective unit as claimed in claim 13, wherein the forming cam is formed on a switch foot mounted on the switching device.

15. The protective unit as claimed in claim 13, wherein the lever arrangement further includes a third lever, the third lever for coupling the second lever to the protective plate, the coupling being provided at least using a pin that engages in a slot of the second lever and a supporting surface which is allocated to the protective plate being formed on the third lever.

16. The protective unit as claimed in claim 7, wherein the forming cam is formed on a switch foot mounted on the switching device.

17. The protective unit as claimed in claim 16, wherein the lever arrangement further includes a third lever, the third lever for coupling the second lever to the protective plate, the coupling being provided at least using a pin that engages in a slot of the second lever and a supporting surface which is allocated to the protective plate being formed on the third lever.

18. The protective unit as claimed in claim 1, wherein the lever arrangement further includes a third lever, the third lever for coupling the second lever to the protective plate, the coupling being provided at least using a pin that engages in a slot of the second lever and a supporting surface which is allocated to the protective plate being formed on the third lever.

19. The protective unit as claimed in claim 18, wherein contacts which run in two different planes, arranged one above the other, are allocated two separate protective plates, the two protective plates being coupled by way of a tension spring, and where the protective plate allocated to the upper plane is adjacent to a first supporting surface and the protective plate allocated to the lower plane is adjacent to a holding surface of the third lever.

20. A protective unit to prevent contact with conductive contacts in a withdrawable rack of a switching device, comprising:

at least one displaceable protective plate; and a lever arrangement including at least first and second levers for operating the protective plate, wherein a linking joint of the first and second levers is functional as a pivot bearing of the first lever, the first lever being pivotable out of a displacement path of the switching device by way of a slide block running in a graded manner in a pivoting direction of the first lever.

* * * * *